April 28, 1953     V. P. FINEO     2,636,775
VEHICLE SIDE WINDOW CLEANING DEVICE
Filed Feb. 18, 1952     2 SHEETS—SHEET 1
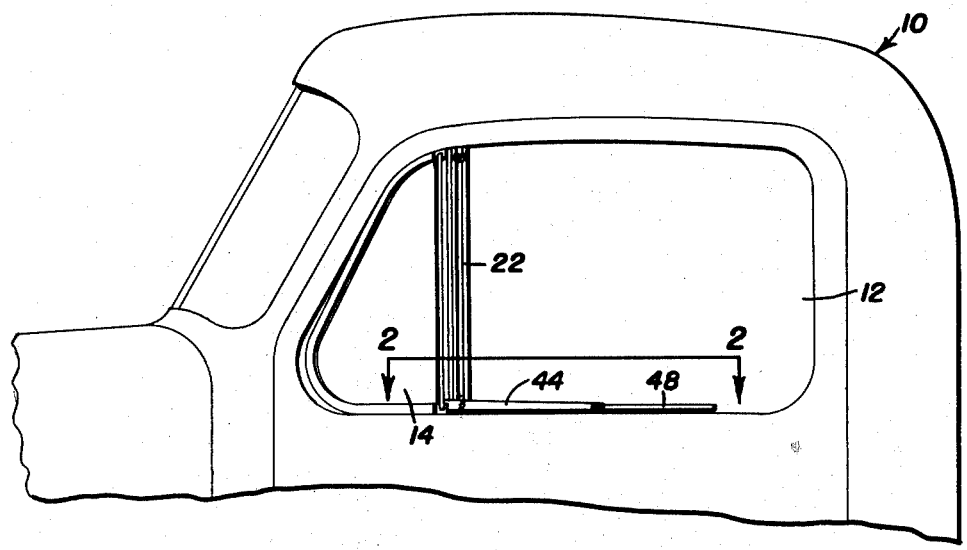
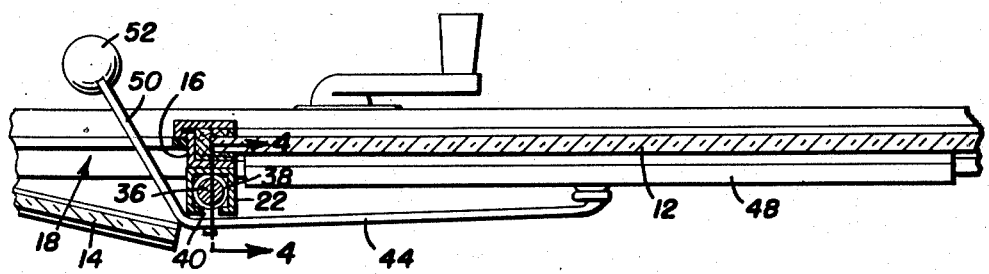
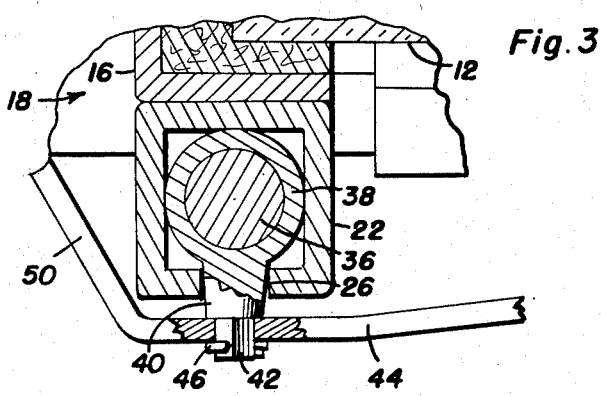
Vincent P. Fineo
INVENTOR.

April 28, 1953     V. P. FINEO     2,636,775
VEHICLE SIDE WINDOW CLEANING DEVICE
Filed Feb. 18, 1952     2 SHEETS—SHEET 2
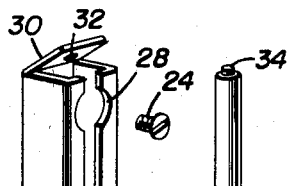
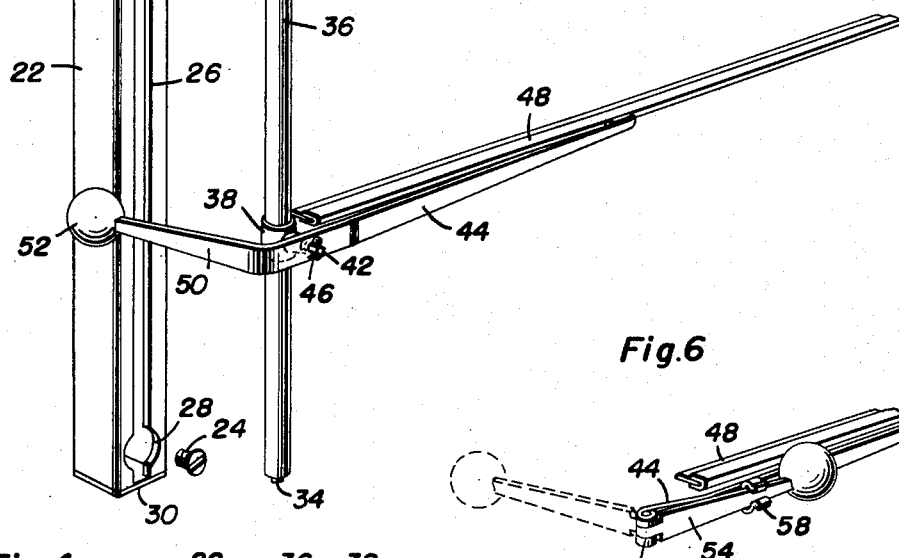
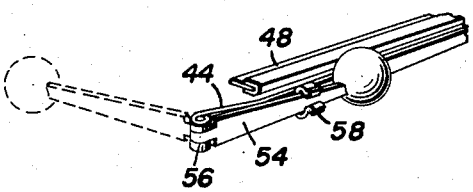
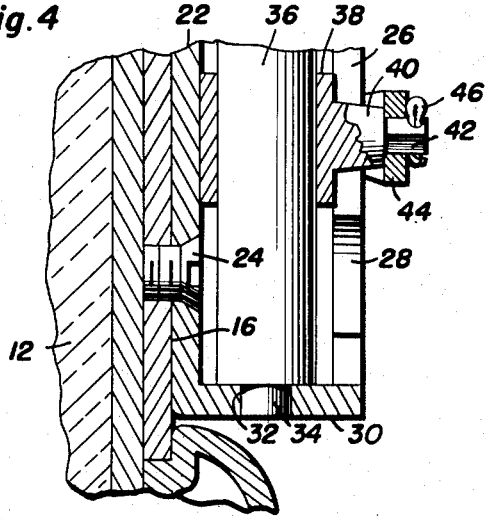
Vincent P. Fineo
*INVENTOR.*

Patented Apr. 28, 1953

2,636,775

UNITED STATES PATENT OFFICE 2,636,775

VEHICLE SIDE WINDOW CLEANING DEVICE

Vincent P. Fineo, Brooklyn, N. Y.

Application February 18, 1952, Serial No. 272,024

4 Claims. (Cl. 296—44)

This invention relates to new and useful improvements and structual refinements in window cleaning or wiping devices for vehicles, and the principal object of the invention is to facilitate cleaning of side windows to afford the driver lateral visibility.

The above object is achieved by the provision of a cleaning device which is adapted for attachment to a side window frame member, the device including an actuating handle which projects through the usual vent window opening into the vehicle, whereby the device may be manually actuated.

An important feature of the invention resides in the provision of means for disintegrating or collapsing the device when it is not in use, so that it does not interfere with the normal opening and closing of the side window and vent window.

Some of the advantages of the invention lie in its simplicity of construction, in its efficient operation and in its adaptability for attachment to vehicles of different types.

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view of a vehicle body showing the invention applied thereto;

Figure 2 is a horizontal sectional view, taken substantially in the plane of the line 2—2 in Figure 1;

Figure 3 is a fragmentary sectional detail of the subject shown in Figure 2 on an enlarged scale;

Figure 4 is a fragmentary sectional view taken substantially in a plane of the line 4—4 in Figure 2, but on an enlarged scale;

Figure 5 is a group perspective view of the invention per se; and,

Figure 6 is a perspective view of a modified form of the arm, wiper and handle such as may be used in the invention.

Like characters of reference are employed to designate like parts in the specification and throughout the several views.

Referring now to the accompanying drawings in detail, the general reference character 10 designates a vehicle body having a vertically sliding side window 12, a vent window 14 which is pivotally mounted for outward swinging movement, and an upwardly extending window frame member 16 disposed between the windows 12, 14, as will be readily understood. The opening of the vent window 14 is indicated at 18 in Figure 2.

The invention consists of a side window cleaning device which is designated generally by the reference character 20 and embodies in its construction an elongated housing 22 which is secured by a plurality of screws 24 to the window frame member 16 and is provided in the outer wall thereof with an upwardly extending slot 26, end portions of the slot being enlarged at 28 to facilitate the installation of the screws 24.

The ends of the housing 22 assume the form of bendable plates 30 having apertures 32 therein to accommodate trunnions 34 at the ends of a supporting rod 36 which is disposed axially in the housing by means of the plates 30, as is best shown in Figure 4. By virtue of the bendability of the plates 30, the rod 36 may be installed or removed, when necessary.

A carrier 38, assuming the form of a tubular collar, is slidable on the rod 36 and is provided with a lateral protuberance or boss 40 which projects outwardly through the slot 26 of the housing 22 and terminates in a polygonal shank 42.

An arm 44 is non-rotatably mounted on the shank 42 and is sustained removably in position thereon by a cotter pin 46, and a conventional windshield wiper blade 48 is suitably mounted at one end of the arm 44 to frictionally engage the side window 12. An angulated handle 50, constituting an integral continuation of the other end of the arm 44, projects inwardly through the vent window opening 18 into the vehicle and carries a hand knob 52, so that when the invention is to be used, the handle 50 is simply slid upwardly and downwardly while the carrier 38 slides upwardly and downwardly on the support rod 36 and the wiper blade 48 correspondingly slides upwardly and downwardly on the outer surface of the window 12. Alternatively, the wiper device may remain stationary and the window 12 itself may be slid upwardly and downwardly to effect the cleaning operation. Needless to say, while the handle 50 projects through the vent opening 18 into the vehicle, the vent window 14 is left partially open and when the invention is not in use, the cotter pin 46 may be simply removed so as to facilitate removal of the arm 44, wiper 48 and handle 50 from the support means 22, 36, 38 and 40, so that full closing of the vent window 14 is facilitated.

In a modified embodiment of the invention shown in the accompanying Figure 6, the actuating handle 54 is hingedly connected at 56 to the arm 44 rather than being formed integrally therewith, so that when the invention is not in use, the handle 54 may be swung outwardly from the vehicle, that is, outside the vent window 14, and folded upon the arm 44 as shown. The handle 54 may be sustained in its folded position by means of a resilient clip 58 provided on the arm 44, if so desired. This modified form of the invention permits the closing of the vent window without the necessity of removing the arm 44 from the support means.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In combination with a vehicle body including a vertically sliding side window, a vent window opening adjacent thereto and an upwardly extending window frame member between said window and said opening, a window cleaning device comprising an upwardly extending support member secured to said frame member, a carrier slidable on said support member, an arm mounted on said carrier, a wiper mounted on said arm and engaging the outer surface of said window, and a handle provided on said arm and extending into said body through said opening.

2. The device as defined in claim 1 together with hinge means connecting said handle to said arm, whereby the handle may be folded from an operative position inside said body to an inoperative position outside of said opening.

3. A vehicle side window cleaning device, comprising a substantially upright support member adapted to be secured to a side window frame, a carrier slidable on said support member, an arm mounted on said carrier, a window wiper mounted on said arm, and a handle provided on said arm for actuating the same, said support member comprising an elongated housing provided at one side thereof with a longitudinally extending slot, and a guide rod mounted axially in said housing, said carrier being slidable on said rod and including an arm supporting portion projecting outwardly through said slot.

4. The combination of claim 3 together with hinge means connecting said handle to said arm, whereby the handle may be folded from an inoperative position substantially parallel to the arm.

VINCENT P. FINEO.

References Cited in the file of this patent

UNITED STATES PATENTS

| Number | Name | Date |
|---|---|---|
| 944,245 | Rochford | Dec. 21, 1909 |
| 1,095,468 | Heinrich | May 5, 1914 |
| 1,183,463 | Jepson | May 16, 1916 |
| 2,563,252 | Larsen | Aug. 7, 1951 |

FOREIGN PATENTS

| Number | Country | Date |
|---|---|---|
| 123,006 | Sweden | Oct. 12, 1948 |